(12) United States Patent  (10) Patent No.: US 7,556,283 B2
Horiuchi et al.  (45) Date of Patent: Jul. 7, 2009

(54) AIR BAG MODULE MOUNTING STRUCTURE

(75) Inventors: Tadanori Horiuchi, Wako (JP); Tsuguhito Ichiriki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/470,414

(22) Filed: Sep. 6, 2006

(65) Prior Publication Data

US 2007/0057489 A1  Mar. 15, 2007

Related U.S. Application Data

(60) Provisional application No. 60/715,153, filed on Sep. 9, 2005.

(51) Int. Cl.
B60R 21/16 (2006.01)
(52) U.S. Cl. .................. 280/728.2; 180/219; 280/730.1
(58) Field of Classification Search .............. 280/730.2, 280/728.2, 730.1; 180/219
See application file for complete search history.

(56) References Cited

U.S. PATENT DOCUMENTS

| 4,660,854 A | * | 4/1987 | Suzuki et al. ............... 280/782 |
| 4,678,054 A | * | 7/1987 | Honda et al. ................ 180/225 |
| 4,684,144 A | * | 8/1987 | Tanaka ..................... 280/281.1 |
| 4,727,953 A | * | 3/1988 | Kudo et al. ................. 180/219 |
| 5,967,545 A | * | 10/1999 | Iijima et al. .............. 280/730.1 |
| 6,007,090 A | * | 12/1999 | Hosono et al. ........... 280/730.2 |
| 6,991,254 B2 | * | 1/2006 | Yanagibashi et al. ..... 280/730.1 |
| 7,083,187 B2 | * | 8/2006 | Akiyama et al. ......... 280/730.1 |
| 2005/0023803 A1 | | 2/2005 | Kuroe et al. |
| 2006/0037800 A1 | * | 2/2006 | Kawase ...................... 180/219 |
| 2007/0052214 A1 | * | 3/2007 | Miyata ..................... 280/730.1 |

FOREIGN PATENT DOCUMENTS

JP  2003-276553 A  10/2003
JP  2003-285787 A  10/2003

* cited by examiner

Primary Examiner—Eric Culbreth
(74) Attorney, Agent, or Firm—Westerman, Hattori, Daniels & Adrian, LLP.

(57) ABSTRACT

An air bag module mounting structure is attached to a motorcycle. The air bag module mounting structure includes an air bag module mounted on a pair of right and left upper tubes that extend rearward from a head pipe of a frame of the motorcycle. The air bag module occupies the space between the right and left upper tubes.

7 Claims, 14 Drawing Sheets

AIR BAG MODULE MOUNTING STRUCTURE

This application claims benefit of earlier filed U.S. Provisional Application No. 60/715,153 filed on Sep. 9, 2005.

FIELD OF INVENTION

The present invention relates to an air bag module mounting structure, and more particularly to an air bag module mounting structure which can reduce the volume of an installation space for an air bag module and can ensure high maintainability.

BACKGROUND OF THE INVENTION

In general, the application of an air bag for restraining a rider in the event that an impact greater in level than a predetermined value is applied to a vehicle body of a motorcycle is known.

For example, Japanese Patent Laid-Open No. 2003-276553 discloses an air bag system for a scooter type motorcycle, wherein an air bag module is fixed between a step floor and a rider seat through a supporting stay connected to a body frame.

Also, Japanese Patent Laid-Open No. 2003-285787 discloses an example of an air bag system for a saddle seat type motorcycle such that a fuel tank is located between a handle supporting portion and a rider seat, wherein an air bag module is fixed at a position on the front side of the fuel tank and on the upper side of the handle supporting portion through a supporting stay connected to a body frame.

SUMMARY OF THE INVENTION

In order to improve the installation position of an air bag module, it is important to locate the module near an upper surface of the vehicle body for the purpose of inflation of an air bag. It is also important to avoid an increase in size of the vehicle body due to the installation of the air bag module, and to have no influence upon drivability. However, in a motorcycle having little empty space, it is difficult to obtain such an optimum installation position and to ensure good maintainability.

Accordingly, it is an object of the present invention to provide an air bag module mounting structure which can reduce the volume of an installation space for an air bag module and can ensure high maintainability.

According to one aspect of the present invention, an air bag module is mounted on a pair of right and left upper tubes extending rearward from a head pipe of a frame so as to straddle the space between the right and left upper tubes. Accordingly, the air bag module can be stably mounted. Also, in the event that an impact is applied to the vehicle body, the air bag module is protected by the upper tubes, and it is maintained at a proper position without displacement or the like.

According to another aspect of the present invention, the air bag module is located above the upper tubes at a position on the front side of a rider seating position. Accordingly, the rider can be effectively restrained by the air bag.

According to another aspect of the present invention, the air bag module is provided with supporting stays extending downward, and the air bag module is fixed through the supporting stays to the upper tubes. Accordingly, the air bag module can be fixed at an optimum position by optimizing the height of the supporting stays.

According to another aspect of the present invention, an audio unit is located below the air bag module, and the audio unit is fixed to the supporting stays. Accordingly, the space formed below the air bag module can be efficiently utilized.

According to another aspect of the present invention, an air cleaner box is located below the audio unit in the space between the right and left upper tubes. Accordingly, the space formed below the air bag module after installing the audio unit can be utilized, which reduces the volume of the installation space required for the air bag module.

According to another aspect of the present invention, an air bag control device is fixed to one of the supporting stays on one lateral side of the air bag module. Accordingly, various peripheral components can be arranged in a concentrated matter around the air bag module, so that the maintenance of these components can be easily performed and wiring cords can be simplified to thereby reduce the number of manufacturing steps. Also, the drivability can also be improved.

According to another aspect of the present invention, a fuel injection control device is fixed to another one of the supporting stays on the other lateral side of the air bag module. Accordingly, various peripheral components can be arranged in a concentrated matter around the air bag module, so that the maintenance of these components can be easily performed and wiring cords can be simplified to thereby reduce the number of manufacturing steps. Also, the drivability can also be improved.

According to another aspect of the present invention, the supporting stays are fixed to the upper tubes at four points, and one of the four points is provided by a detachable fastening structure. Accordingly, the audio unit and an upper cover of the air cleaner box can be removed without the need for removal of the air bag module. Thus, the installation space for the air bag module can be reduced in volume, and high maintainability can be ensured.

BRIEF DESCRIPTION OF THE DRAWINGS

A preferred embodiment of the present invention will be described with reference to the accompanying drawings, wherein.

DETAILED DESCRIPTION OF THE INVENTION

Embodiments of the present invention will be described with reference to the accompanying drawings.

Figure 1:
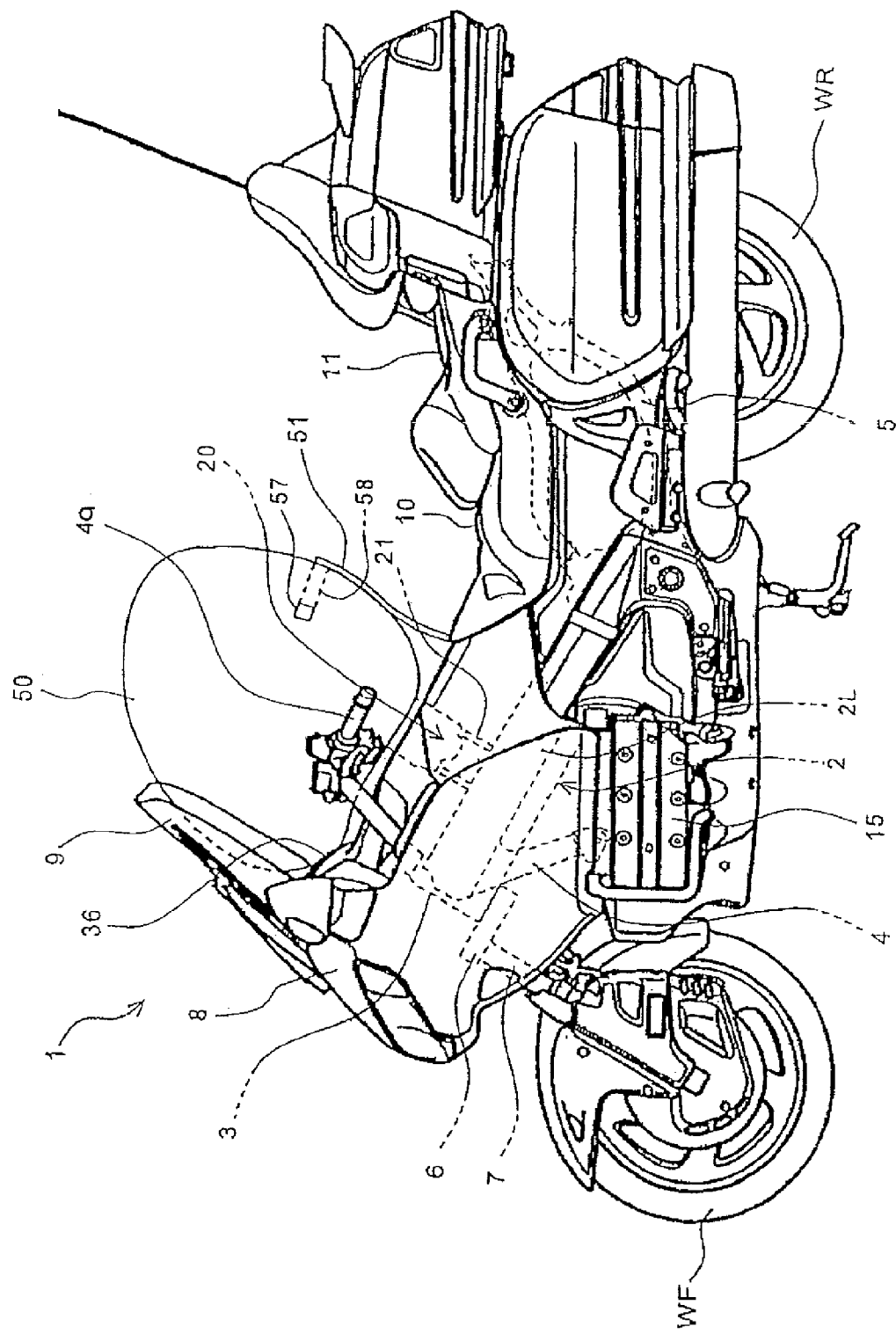
FIG. 1 is a side view of a motorcycle using an air bag module mounting structure according to one embodiment of the present invention.

FIG. 1 is a general side view of a motorcycle 1 using an air bag module mounting structure according to one embodiment of the present invention. The motorcycle 1 has a frame 2 composed mainly of a head pipe 3 and a pair of right and left upper tubes 2R and 2L (the right upper tube 2R being shown in FIG. 4) extending rearward from the head pipe 3 so as to be inclined down toward the rear end of the vehicle. A pair of lower tubes 4 extend downward from the upper tubes 2R and 2L at a position near the head pipe 3, and an engine 15 as a driving source is fixedly hung from the lower ends of the lower tubes 4. A pair of right and left front forks 7 steerable by a handle 4a are pivotably mounted through a lower bracket 6 to the head pipe 3, and a front wheel WF is rotatably supported through its axle to the lower ends of the front forks 7. A seat frame 5 for supporting a main seat 10 and a rear seat 11 is connected to a rear portion of the frame 2. Further, a swing arm (not shown) is pivotably connected to the frame 2, and a rear wheel WR as a drive wheel is rotatably supported through its axle to the rear ends of the swing arm.

The motorcycle 1 according to this embodiment is provided with an air bag 50 adapted to be inflated into a substantially spherical shape having such a size as to cover the upper side of the main seat 10 and to touch a meter case 36 and the vicinity of a windscreen 9 provided at the upper end of an upper cowl 8 in the event that an impact greater in level than a predetermined value is applied to the vehicle body. An air bag module 20 including the air bag 50 and an inflator (not shown) for generating a gas for inflating the air bag 50 is fixed through a pair of supporting stays 21 to the upper tubes 2R and 2L at positions on the front side of a rider seating position on the main seat 10 in the longitudinal direction of the vehicle. A pair of supporting belts 51 are connected at their upper ends to a rear portion of the air bag 50, so as to keep the air bag 50 at a proper position in effectively restraining the rider.

Figure 2:
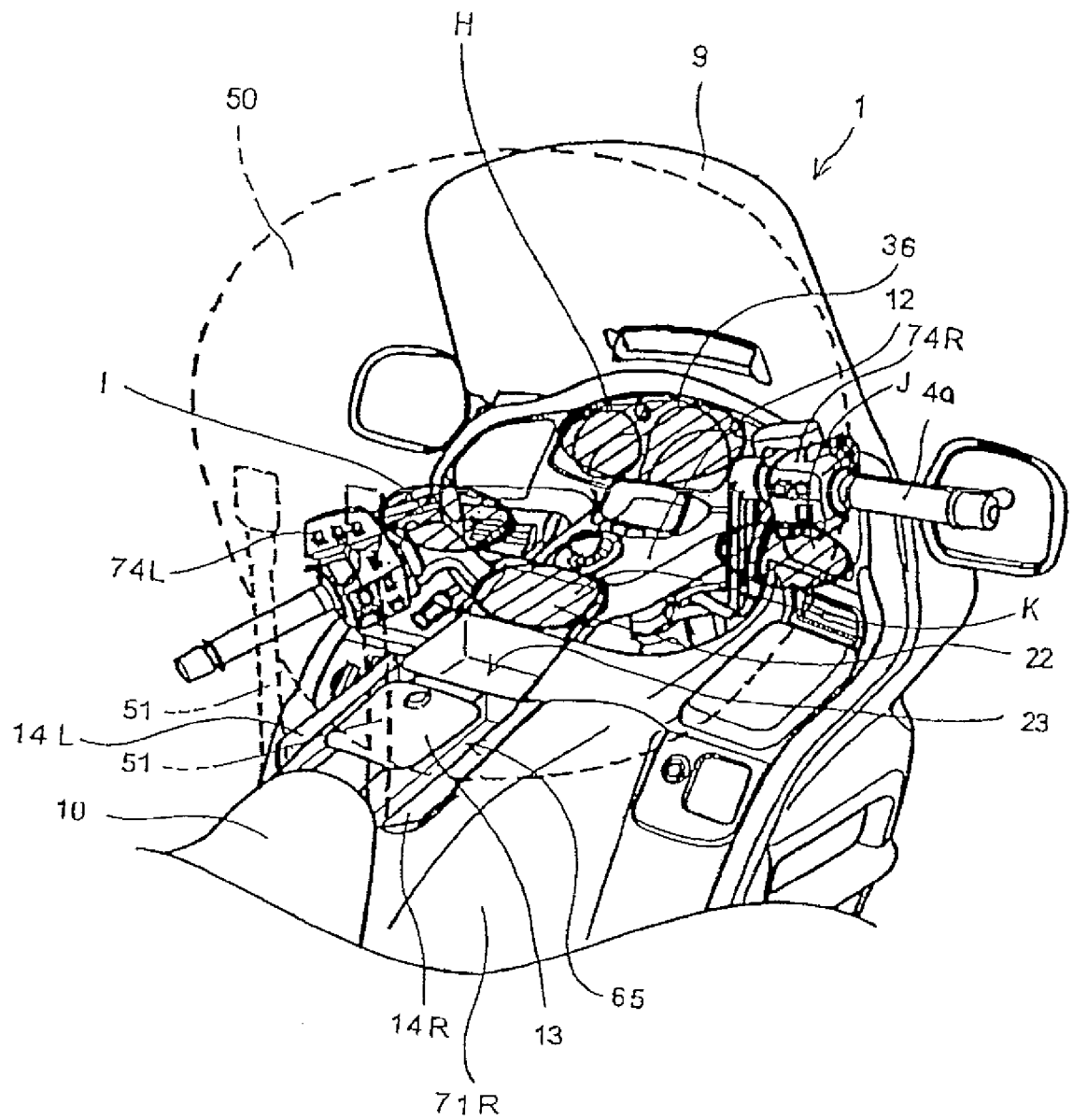
FIG. 2 is a perspective view illustrating the layout of the air bag module mounting structure according to one embodiment of the present invention.

FIG. 2 is an enlarged perspective view of a part of the motorcycle 1 shown in FIG. 1. In FIG. 2, the same reference numerals as those shown in FIG. 1 denote the same or like parts. The air bag module 20 (see FIG. 1) has a boxlike casing 23 and a substantially rectangular module cover 22 for closing the upper side of the casing 23. The inflator and the air bag 50 in its folded condition are provided in the casing 23. The air bag module 20 is installed between an ignition cover 12 and a fuel filler lid 13. The ignition cover 12 is located so as to cover the upper side of a top bridge (not shown) for connecting the handle 4a and the front forks 7. The fuel filler lid 13 is located above a fuel tank (not shown). The inflation of the air bag 50 is performed in such a manner that the gas generated from the inflator is instantaneously supplied to the air bag 50 folded in the casing 23 of the air bag module 20 and that the module cover 22 is pivotally opened about its front side by the pressure of this gas inflating the air bag 50. The supporting belts 51 are normally accommodated in their folded condition in the spaces 65 defined below a pair of right and left belt covers 14R and 14L, respectively. In concert with the inflation of the air bag 50, the supporting belts 51 forcibly open the belt covers 14R and 14L in the laterally opposite directions of the vehicle, and extend upward as shown by the broken lines in FIG. 2.

While the handle 4a shown in FIG. 2 is in a left steered condition, a front lower portion of the air bag 50 in its inflated condition is stably supported at four positions, that is, at a first position I near a left switch portion 74L of the handle 4a in a neutral condition of the handle 4a, a second position J near a right switch portion 74R of the handle 4a in the neutral condition thereof, a third position H on the meter case 36, and a fourth position K on the module cover 22. The lower ends of the supporting belts 51 are firmly secured to a vehicle body member at a position below the main seat 10 located above a top shelter 71R.

Figure 3A:
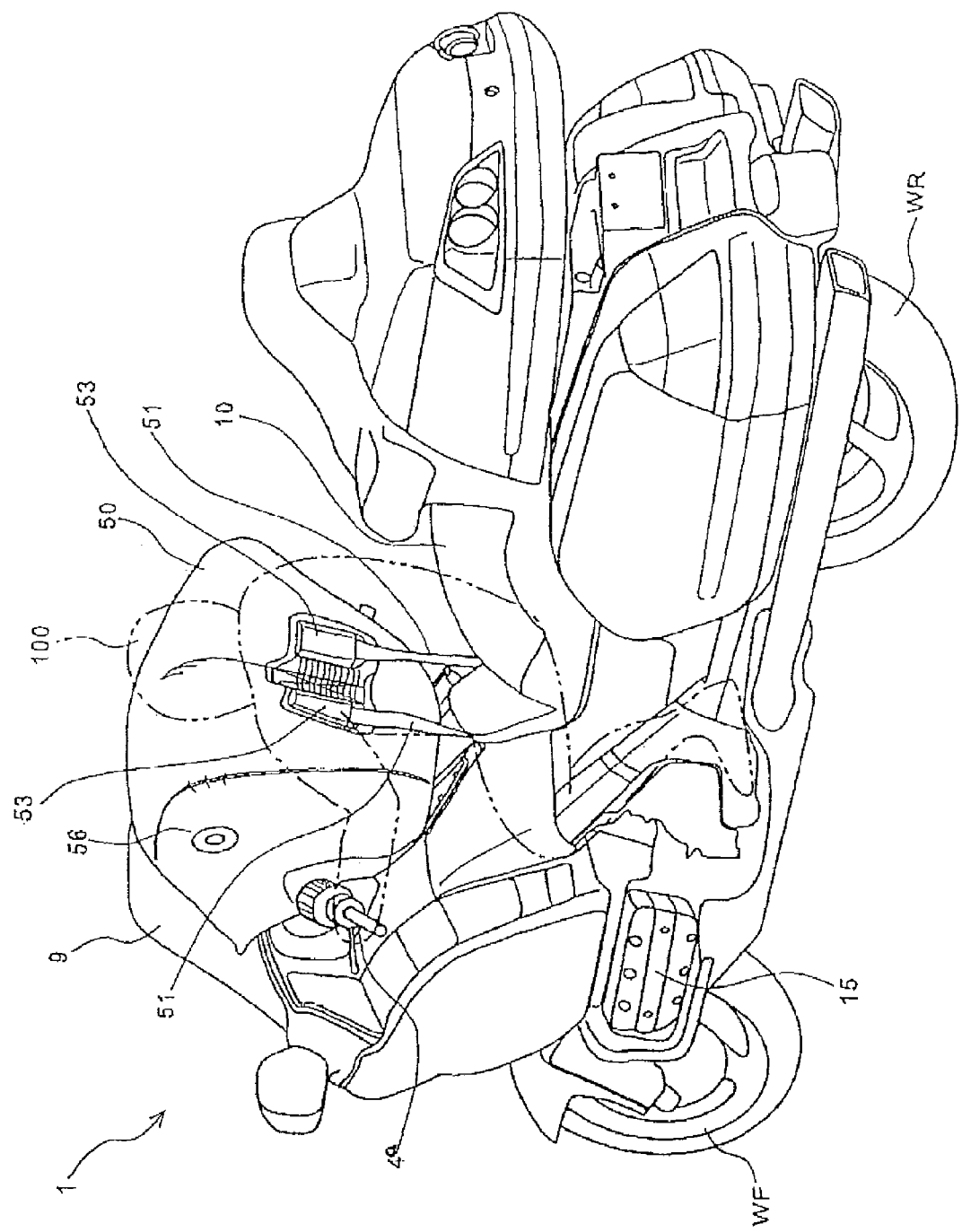
FIG. 3A is a perspective view of the motorcycle using the air bag module mounting structure according to one embodiment of the present invention.

FIG. 3A is a perspective view of the motorcycle 1 at the time the air bag 50 is inflated. The rear surface of the air bag 50 in its inflated condition as opposed to the rider is formed as a substantially V-shaped surface as viewed in plan, so as to effectively embrace the rider 100. As mentioned above, the air bag 50 in its inflated condition is supported not only by the supporting belts 51, but also by the whole of members located below front and lower portions of the air bag 50, including the handle 4a and the meter case 36. Further, the right and left side surfaces of the air bag 50 at their upper portion are formed with a pair of vent holes 56 for discharging the gas from the air bag 50 at a proper speed under the condition where the rider 100 is being restrained by the air bag 50.

Figure 3B:
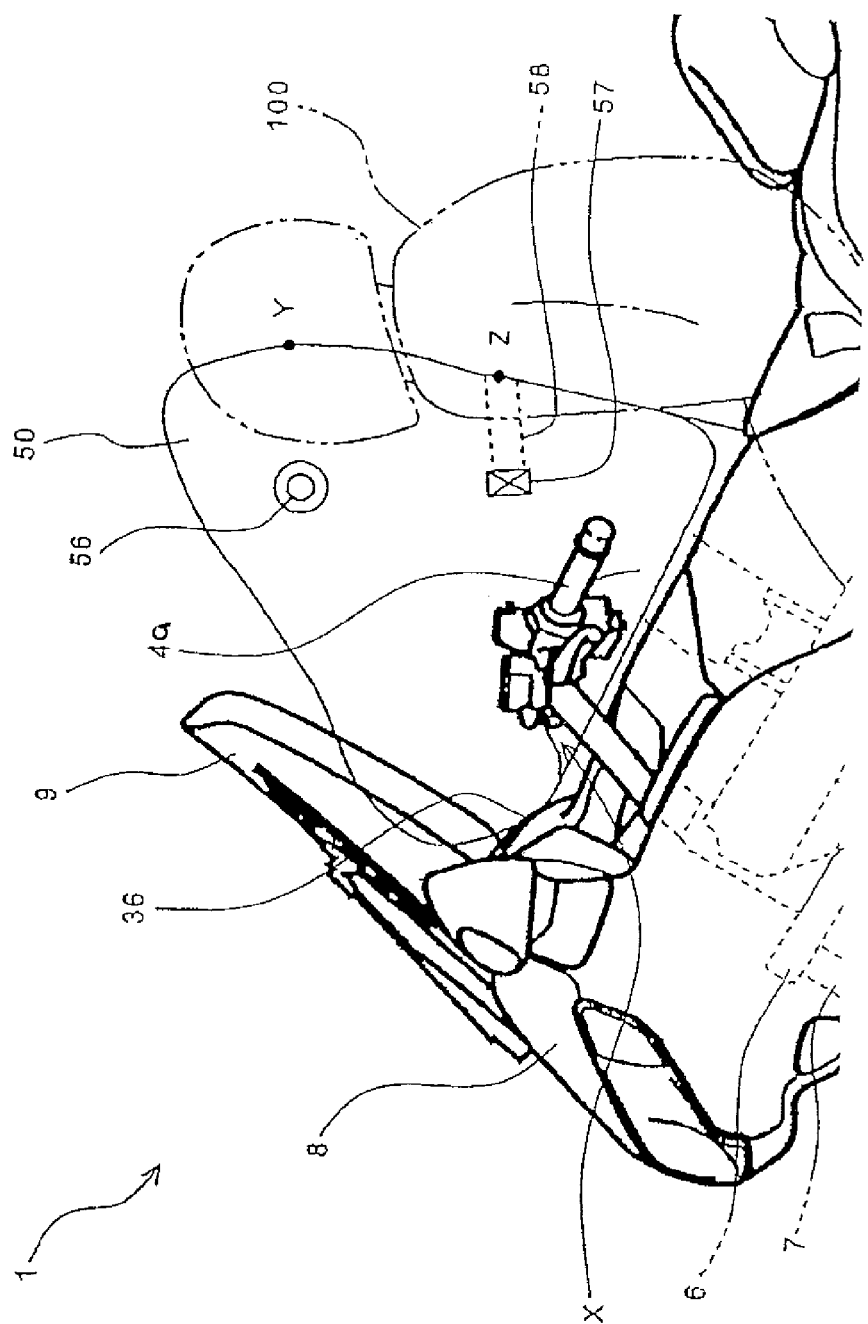
FIG. 3(b) is a side view showing a condition where a rider is restrained by the air bag.

FIG. 3(b) is an enlarged side view showing a condition where the rider 100 is restrained by the air bag 50 in its inflated condition. As shown in FIG. 3(b), the second supporting belt 58 for connecting a pair of right and left joint portions 57 so as to horizontally extend like an arch is provided below the vent holes 56. The second supporting belt 58 functions to restrict excess development of the air bag 50 in the horizontal direction at the time of restraining the rider 100. Further, a pair of right and left recessed portions X shown in FIG. 3(b) corresponding to the upward projections of the handle 4a at its right and left portions are formed at a lower portion of the air bag 50, and these recessed portions X contribute to effective support of the air bag 50.

Figure 3C:
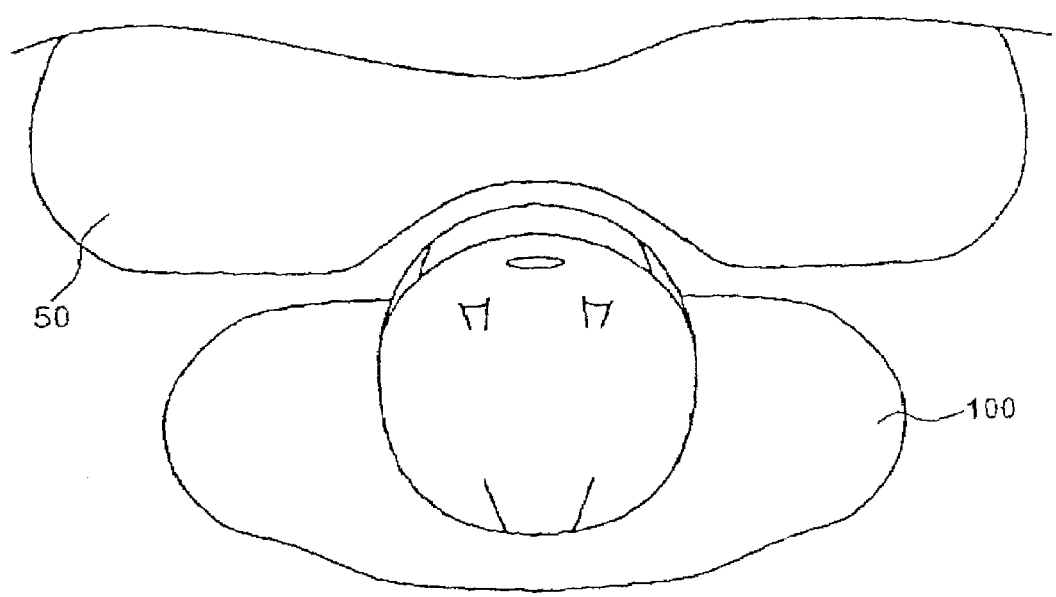
FIG. 3(c) is a schematic sectional view of the air bag at a position adapted to come into contact with the rider's head.
Figure 3D:
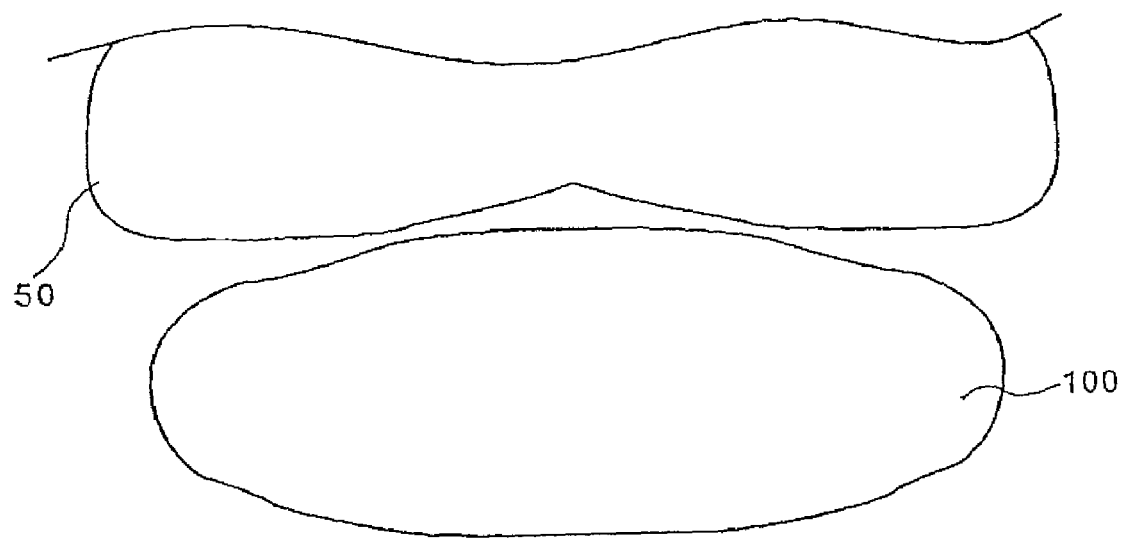
FIG. 3(d) is a schematic sectional view of the air bag at a position adapted to come into contact with the rider's breast.

FIGS. 3(c) and 3(d) show sectional shapes of the air bag 50 along horizontal planes containing a point Y (rider's head) and a point Z (rider's breast) shown in FIG. 3(b), respectively. As shown in FIGS. 3(c) and 3(d), the sectional V-shape of the rear surface of the air bag 50 opposed to the rider 100 is formed so as to fit the shapes of the head and breast of the rider 100. Accordingly, the V-shaped rear surface of the air bag 50 can restrain the rider 100 more efficiently.

Figure 4:
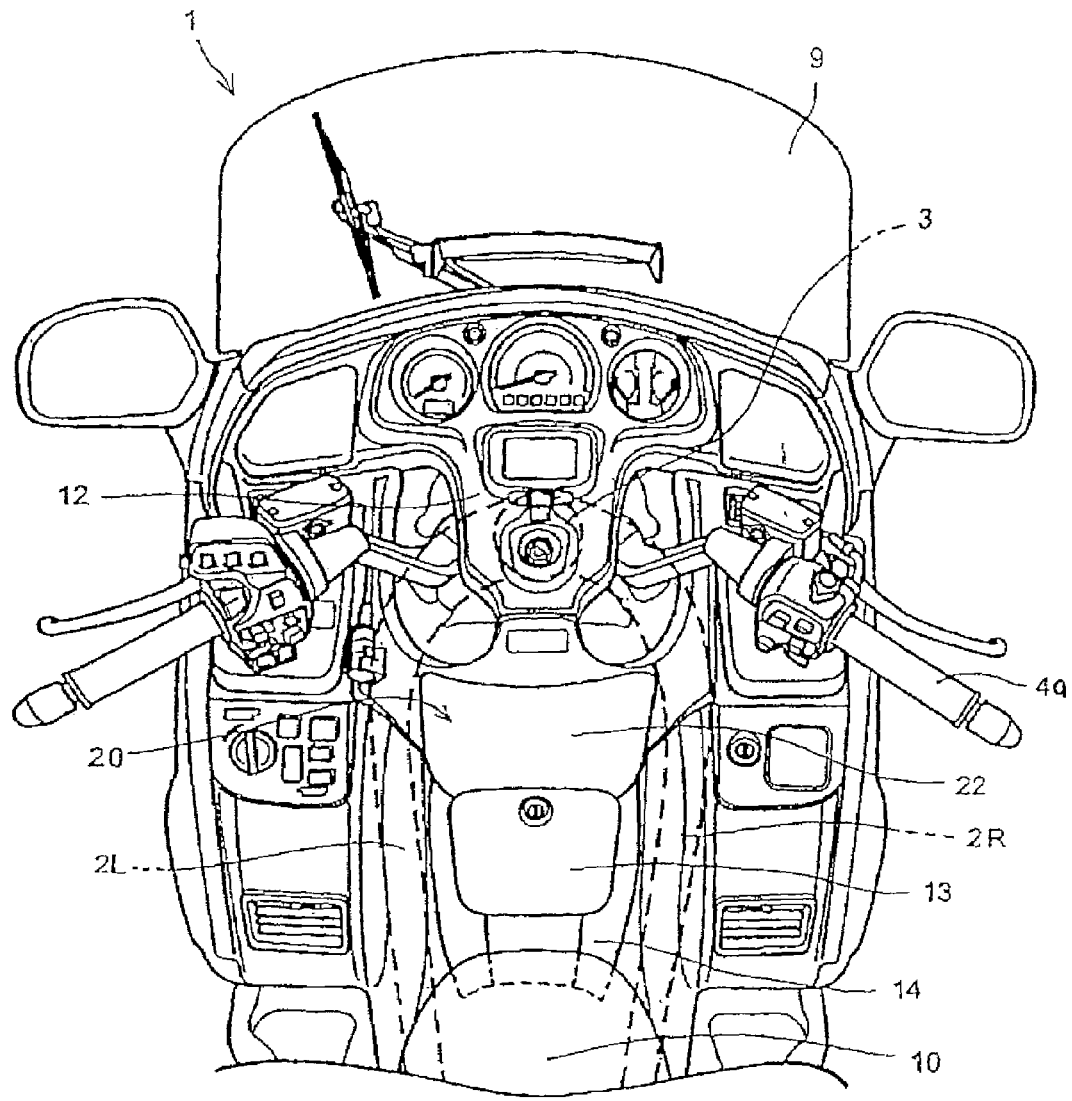
FIG. 4 is a view illustrating the layout of the air bag module mounting structure viewed from the motorcycle.

FIG. 4 is an enlarged plan view of a part of the motorcycle 1 shown in FIG. 1. In FIG. 4, the same reference numerals as those shown in FIGS. 1 to 3(d) denote the same or like parts. FIG. 4 shows a condition before inflation of the air bag 50. As shown in FIG. 4, the right and left upper tubes 2R and 2L connected to the head pipe 3 extend rearward so as to be curved convexly in the laterally opposite directions, and the air bag module 20 is located between the upper tubes 2R and 2L in such a manner that the width of the air bag module 20 falls in the space between the upper tubes 2R and 2L. Accordingly, no lateral projection from the air bag module 20 is present, so that the installed position of the air bag module 20 has no influence on the rider seating position, for example.

Figure 5A:
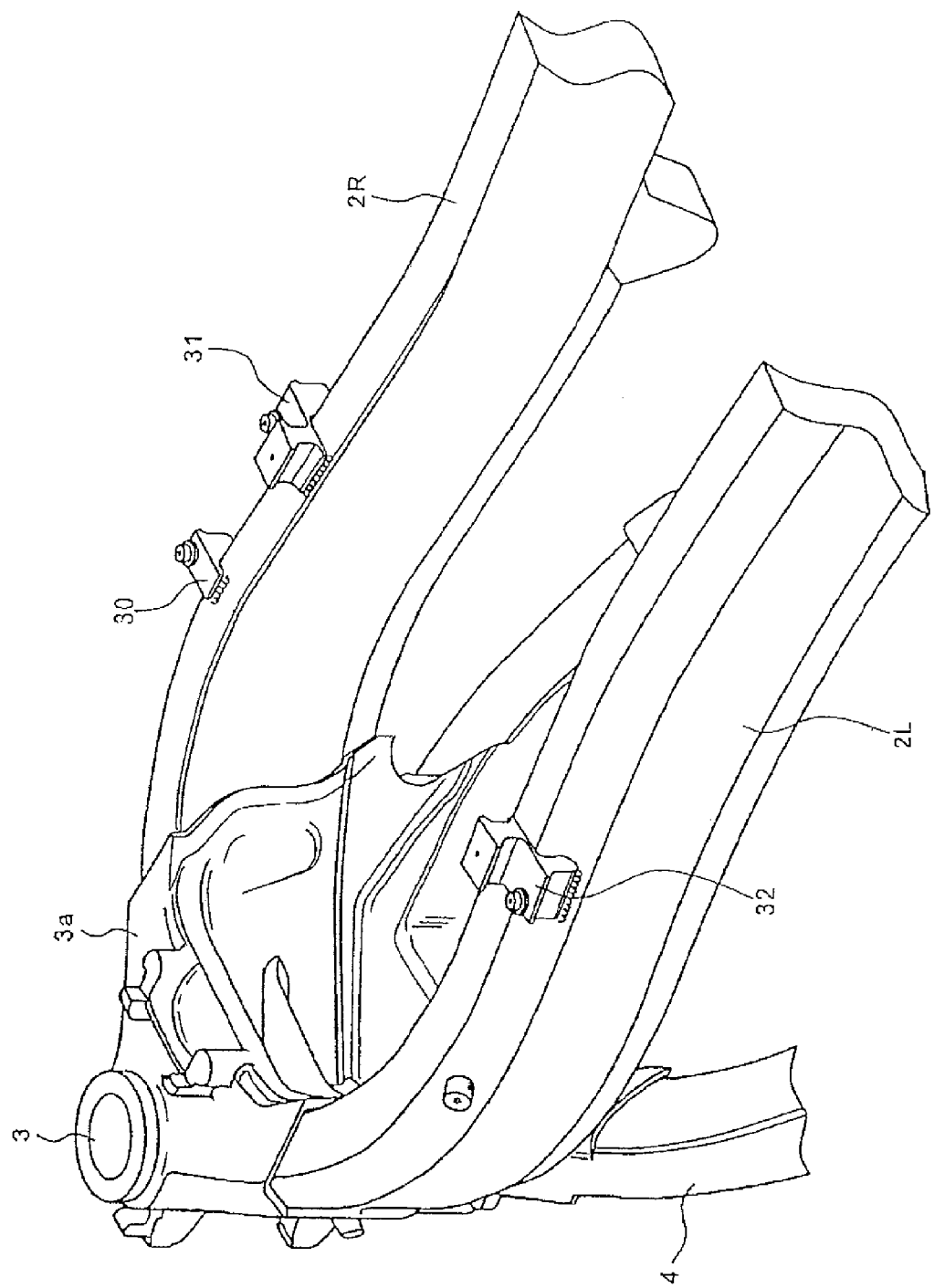
FIG. 5(a) is a perspective view of a frame in the motorcycle using the air bag module mounting structure according to one embodiment of the present invention.
Figure 5B:
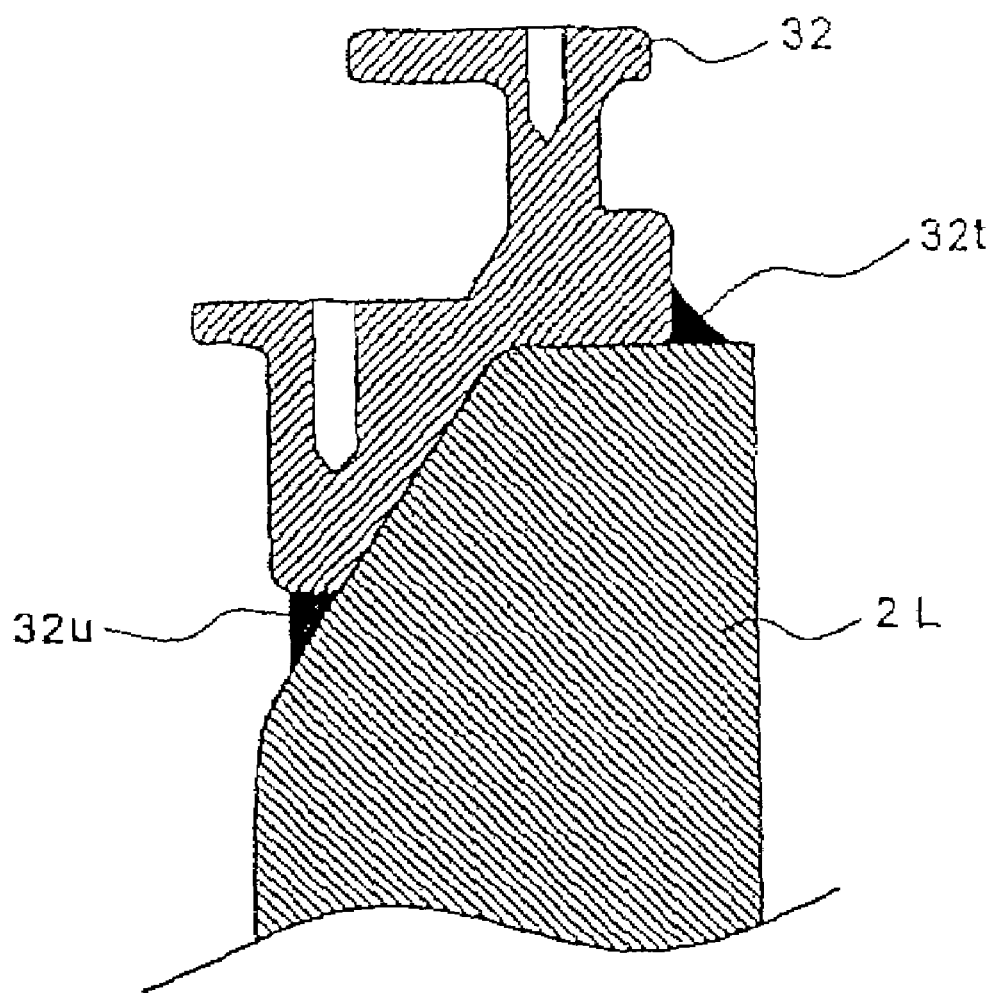
FIG. 5(b) is a sectional view showing a condition where a supporting member is welded to an upper tube.

FIG. 5(a) is a perspective view of the frame 2 in the motorcycle 1 shown in FIG. 1. In FIG. 5(a), the same reference numerals as those shown in FIGS. 1 to 4 denote the same or like parts. The frame 2 has a head member 3a formed with the head pipe 3 through which a stem shaft (not shown) as a pivot shaft for pivotally supporting the front forks 7 is inserted. The right and left upper tubes 2R and 2L are connected to the head member 3a. Two supporting members 30 and 31 for fixing the right supporting stay 21R of the air bag module 20 are connected (e.g., welded) to the right upper tube 2R, and one supporting member 32 for fixing the left supporting stay 21L of the air bag module 20 is connected (e.g., welded) to the left upper tube 2L. As shown in FIG. 5(b), the supporting member 32 is connected (e.g., welded) through weld beads 32t and 32u to the left upper tube 2L. This (welding) structure is applied also to the fixation of the supporting members 30 and 31 to the right upper tube 2R.

Figure 6:
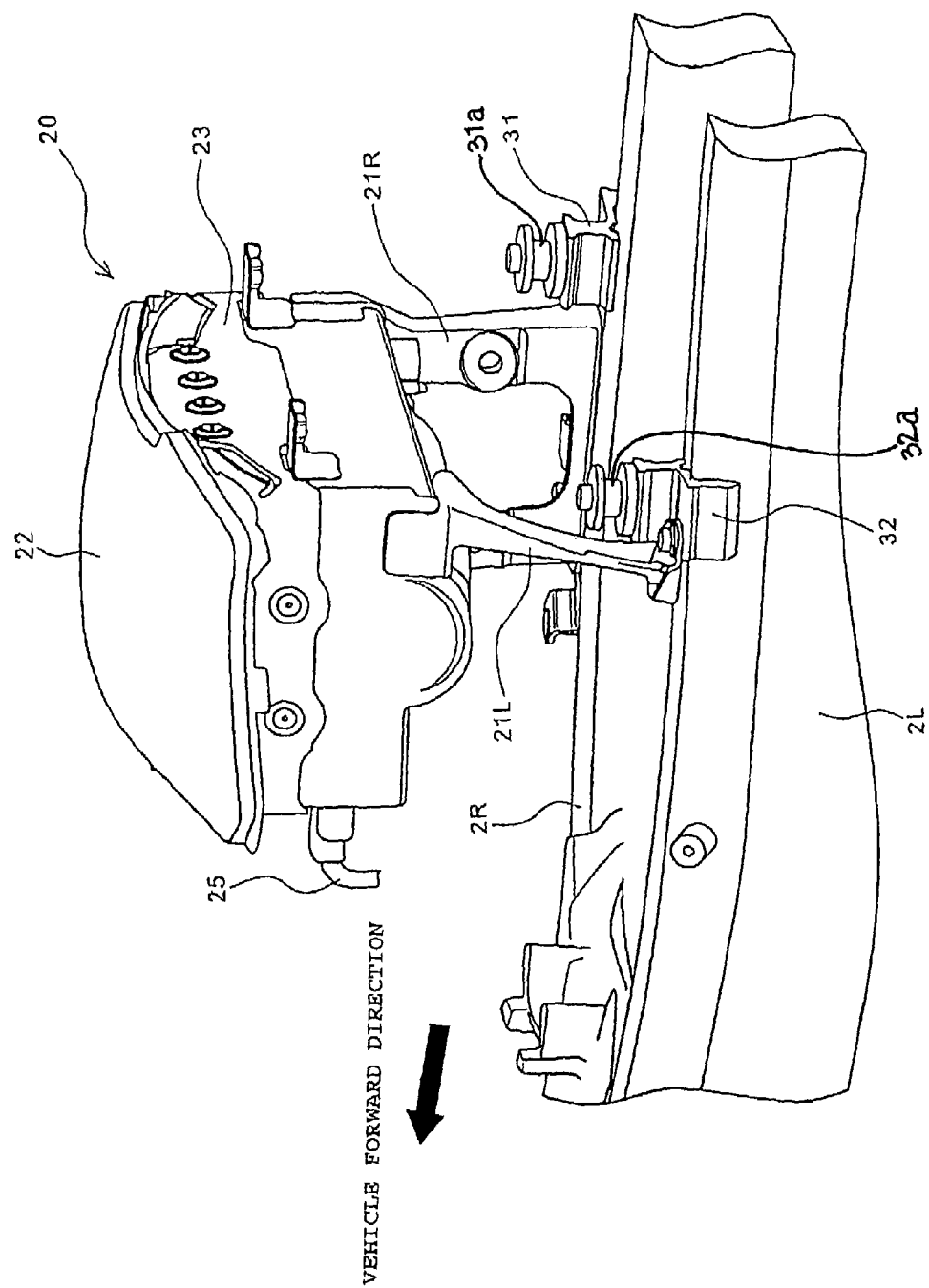
FIG. 6 is a perspective view showing the air bag module mounting structure according to one embodiment of the present invention as viewed from the left side of the vehicle.

FIG. 6 is a perspective view showing a mounting structure of the air bag module 20 as viewed from the left side of the vehicle. In FIG. 6, the same reference numerals as those shown in FIGS. 1 to 5(b) denote the same or like parts. The air bag module mounting structure according to this embodiment, for example, is characterized in that the air bag module 20 is mounted on the upper tubes 2R and 2L of the frame 2 so as to straddle the space between the upper tubes 2R and 2L. The right and left supporting stays 21R and 21L are connected (e.g., welded) to the casing 23 of the air bag module 20 at its lower portion. As mentioned above, the plural supporting members 30, 31, and 32 (see FIG. 5(a)) are connected (e.g., welded) to the upper tubes 2R and 2L. The right supporting stay 21R is fixed to the supporting members 30 and 31 (e.g., by given bolts), and the left supporting stay 21L is fixed to the supporting member 32 (e.g., by a given bolt.) A connector 25 is provided on the front surface of the casing 23, so as to supply an ignition signal to the inflator accommodated in the casing 23.

As shown in FIG. 6, the air bag module 20 in the motorcycle 1 according to this embodiment is located at a relatively high position with respect to the upper tubes 2R and 2L. In the conventional air bag module mounting structure, there is a possibility that such a location of the air bag module 20 may cause a "dead space" below the air bag module 20, which dead space cannot be effectively utilized. However, in the air bag module mounting structure according to this embodiment, the above problem is solved.

Figure 7:
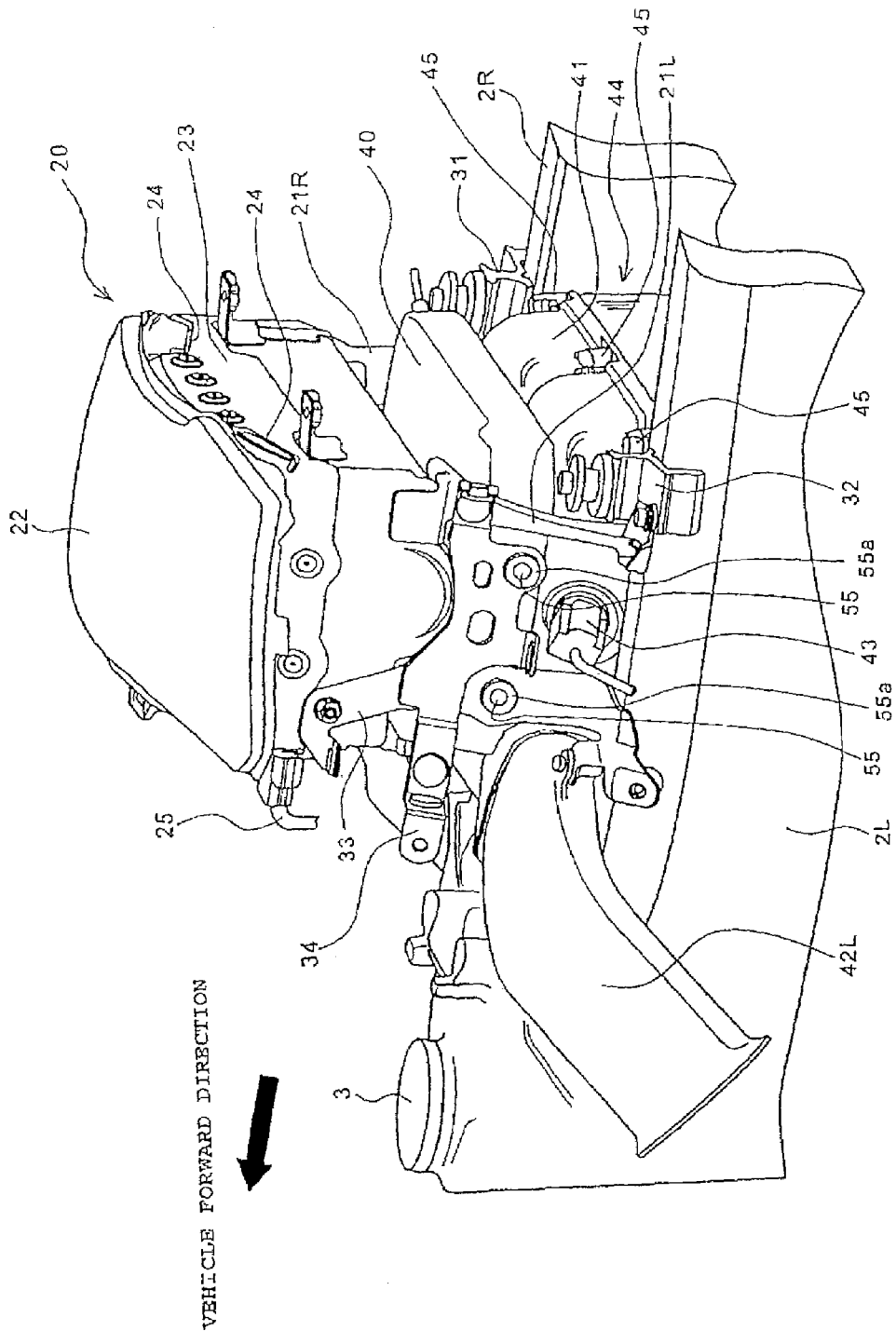
FIG. 7 is a perspective view showing the air bag module mounting structure according to one embodiment of the present invention as viewed from the left side of the vehicle.

FIG. 7 is a perspective view showing the layout of peripheral components in relation to the air bag module 20 as viewed from the left side of the vehicle. In FIG. 7, the same reference numerals as those shown in FIGS. 1 to 6 denote the same or like parts. In the motorcycle 1, an air cleaner box 44 for cleaning the outside air to be introduced into the engine 15 is located so as to be interposed between the upper tubes 2R and 2L, and an upper cover 41 of the air cleaner box 44 is located above a plane corresponding to the upper surfaces of the upper tubes 2R and 2L. The air bag module mounting structure according to this embodiment is characterized in that the air cleaner box 44 including the upper cover 41 is located below the air bag module 20 and that a substantially flat box-shaped audio unit 40 is installed in the space formed between the upper cover 41 of the air cleaner box 44 and the casing 23 of the air bag module 20. Accordingly, the space below the air bag module 20 formed as the result of the optimum location of the air bag module 20 can be effectively used as an installation space for other components, so that the volume of the installation space for the air bag module 20 can be reduced. Further, in the condition where such peripheral components are located as shown in FIG. 7, another supporting stay 33 is connected between the casing 23 and the left upper tube 2L. Accordingly, the air bag module 20 is fixed to the upper tubes 2R and 2L at four points.

A left air duct 42L extending frontward from a left front portion of the air cleaner box 44 is provided to introduce the outside air into the air cleaner box 44 from its front side. The upper cover 41 of the air cleaner box 44 is fixed to a lower case of the air cleaner box 44 at a plurality of fastening portions 45. A connector 43 for outputting a signal from an intake air temperature sensor provided in the air cleaner box 44 is mounted, for example, on the left side surface of the upper cover 41. Further, a fuel injection unit (an FI unit) supporting stay 34 for fixing an FI unit 37 as a fuel injection control device to be hereinafter described is mounted, for example, on the third supporting stay 33 at its upper portion. The audio unit 40, for example, is floatingly fixed to four mounting holes 55 through resin rings 55a for reducing vibrations transmitted mainly from the engine 15. The mounting holes 55 are formed, for example, through the right supporting stay 21R, the third supporting stay 33, and the FI unit supporting stay 34. Further, the rear surface of the casing 23 opposed to the rider is formed, for example, with a pair of slits 24 for passing the supporting belts 51.

Figure 8:
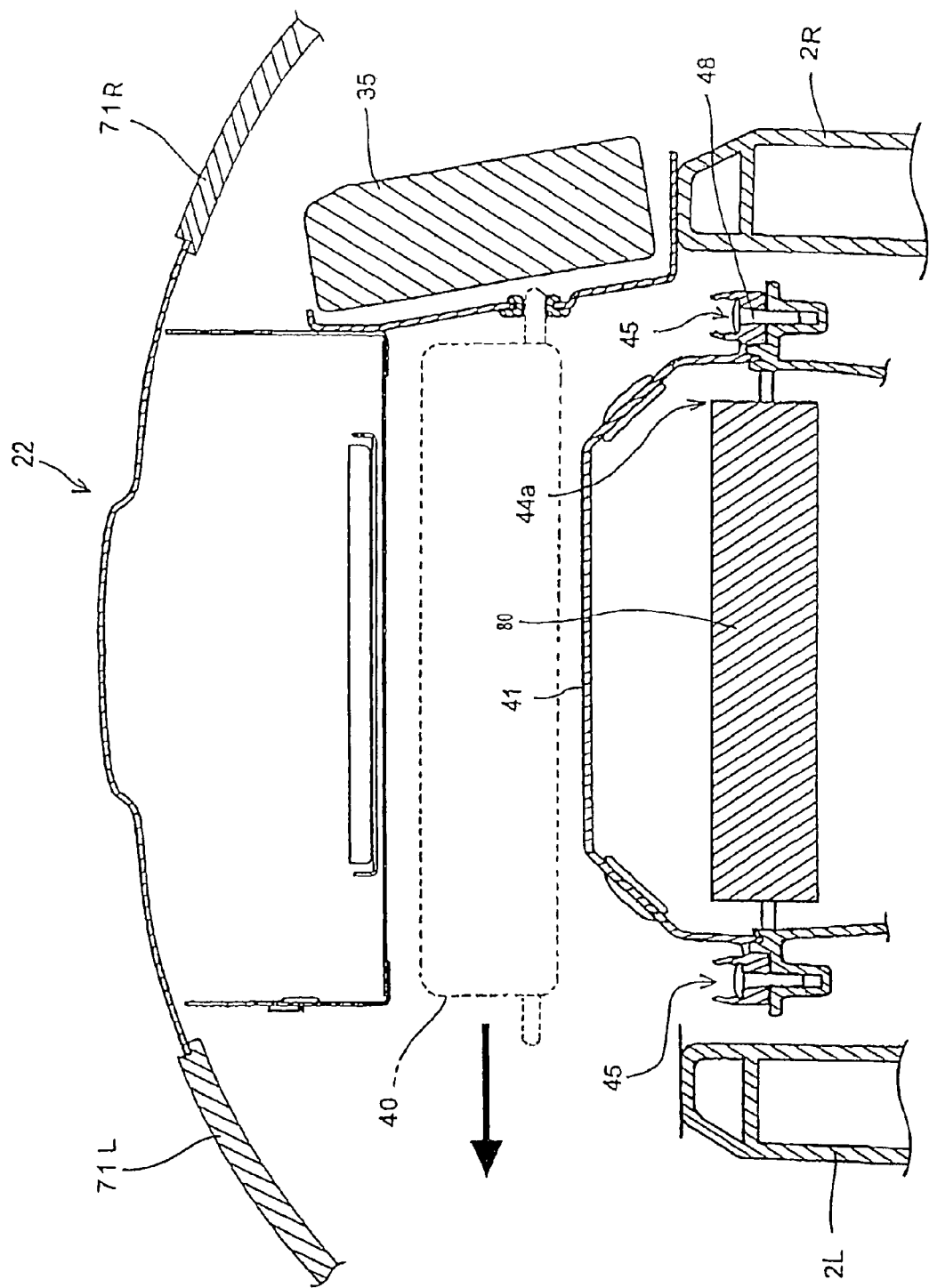
FIG. 8 is a sectional view of the air bag module mounting structure according to one embodiment of the present invention as viewed from the rear side of the vehicle.

FIG. 8 is a sectional view of the mounting structure of the air bag module 20 as viewed from the rear side of the vehicle. In FIG. 8, the same reference numerals as those shown in FIGS. 1 to 7 denote the same or like parts. As shown by an arrow in FIG. 8, by removing the FI unit supporting stay 34 and the third supporting stay 33, the audio unit 40 can be removed from the left front side of the air bag module 20. Also (in the condition where the audio unit 40 has been removed as mentioned above) an air filter 80 accommodated in the air cleaner box 44 can be removed by loosening the mounting screw 48 at each fastening portion 45 to remove the upper cover 41.

Figure 9:
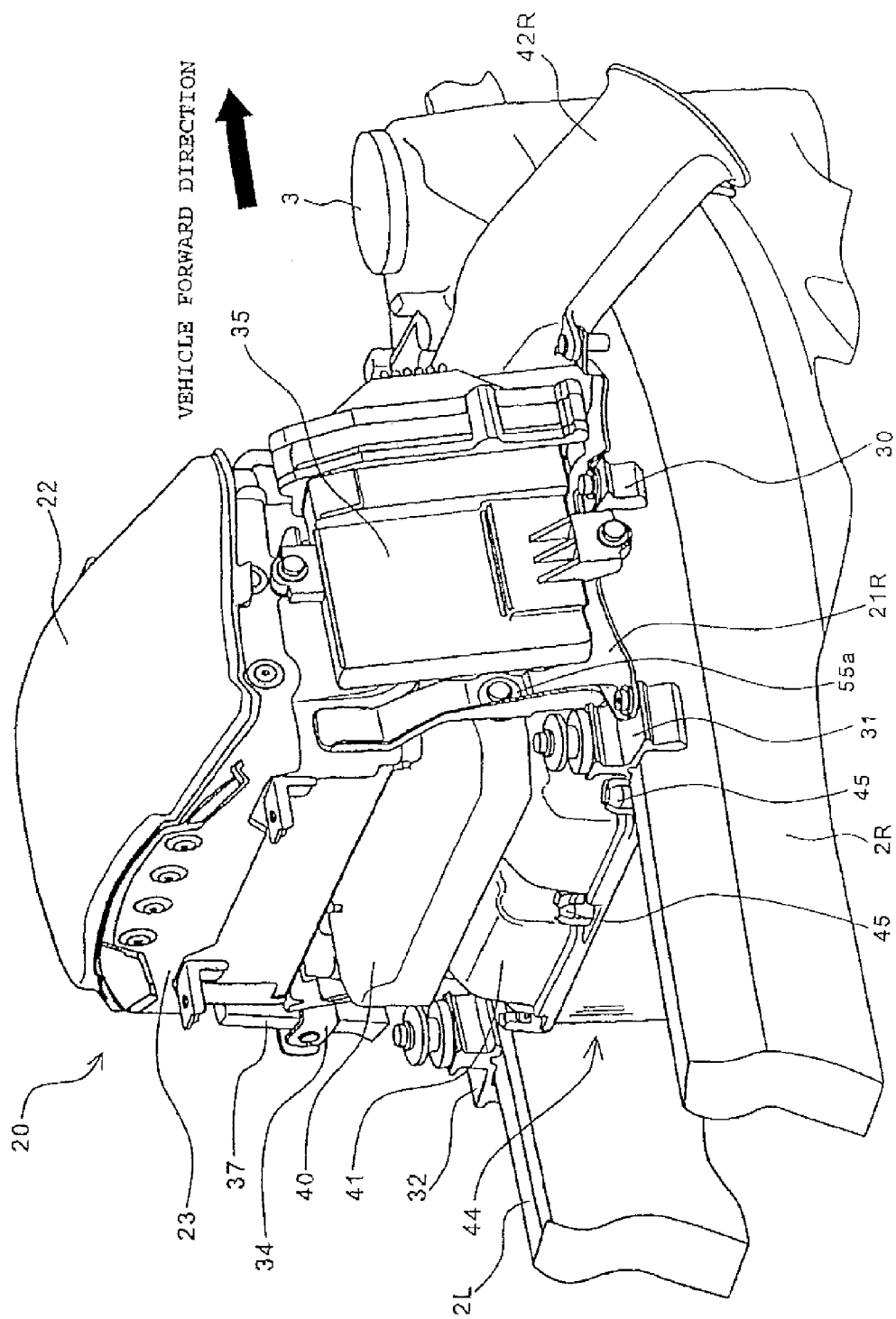
FIG. 9 is a perspective view of the air bag module mounting structure according to one embodiment of the present invention as viewed from the right side of the vehicle.

FIG. 9 is a perspective view of the mounting structure of the air bag module 20 as viewed from the right side of the vehicle. An air bag ECU 35 as an air bag control device for controlling the inflating operation of the air bag 50 according to information from various sensors for measuring an impact etc. applied to the vehicle body is fixed to the right supporting stay 21R, for example by two, upper and lower bolts. The FI unit 37 fixed to the FI unit supporting stay 34 and the air bag ECU 35 are arranged, for example, so as to diverge toward the lower side of the vehicle as viewed in the longitudinal direction of the vehicle. Such a location of the FI unit 37 and the air bag ECU 35 contributes to a reduction of dead space and promotes a reduction in volume of the installation space for the air bag module 20. Further, a right air duct 42R for introducing the outside air into the air cleaner box 44 extends frontward from a right front portion of the air cleaner box 44. The right air duct 42R is fixed, for example, to the right supporting stay 21R.

Figure 10:
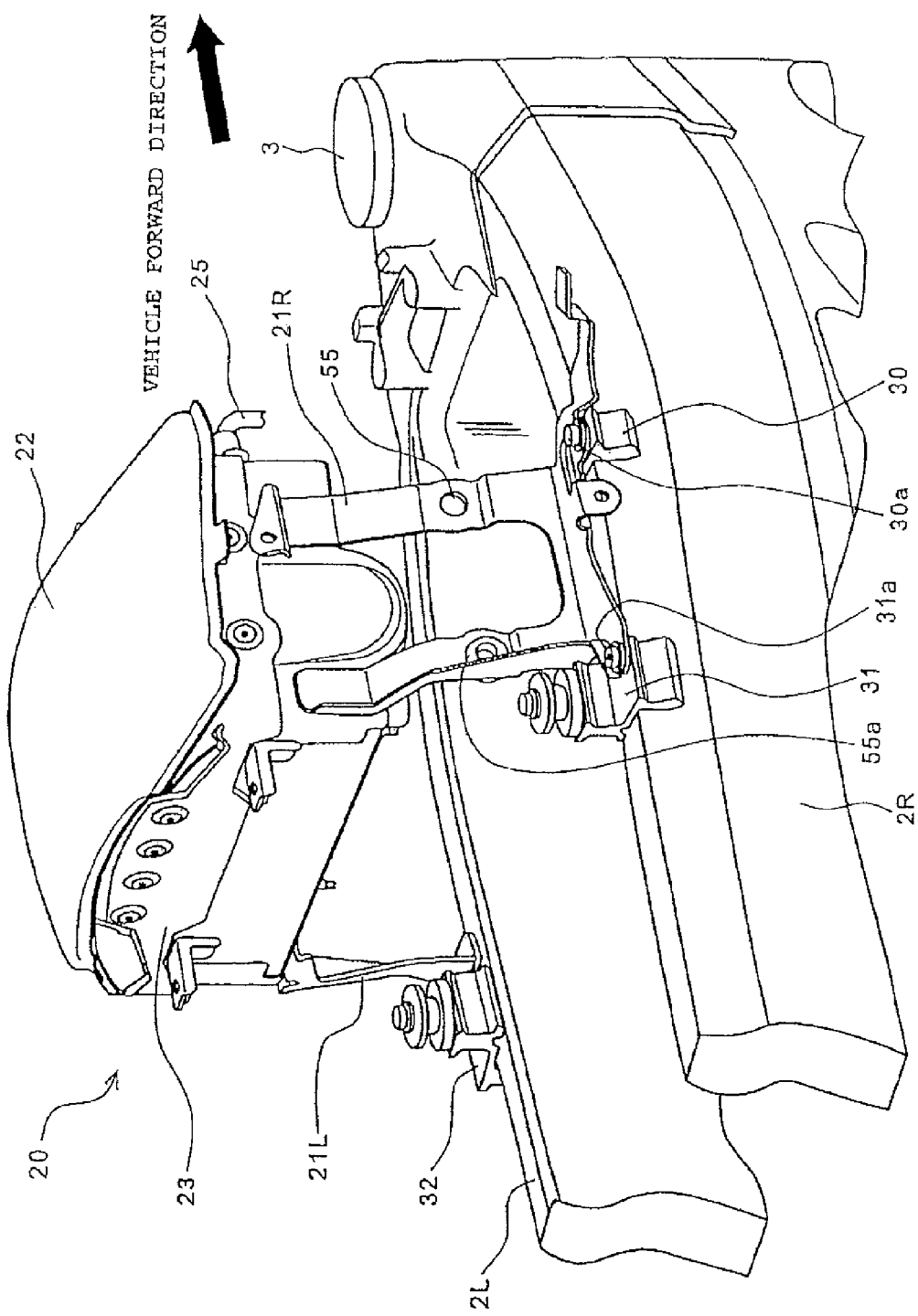
FIG. 10 is a perspective view of the air bag module mounting structure according to one embodiment of the present invention as viewed from the right side of the vehicle.

FIG. 10 is a perspective view similar to FIG. 9, showing a condition where the FI unit 37, the air bag ECU 35, the audio unit 40, and the air cleaner box 44 are removed for illustration. It is preferable to avoid the displacement and removal of the air bag module 20 even in performing the maintenance of peripheral components. In the air bag module mounting structure shown here, the air bag module 20 is fixed through the supporting stays 21 to the frame 2 at four points, and one of these four fixing points is provided by a detachable fastening structure. Accordingly, the audio unit 40 and the upper cover 41 of the air cleaner box 44 can be removed from a position corresponding to this detachable fastening structure without the need for displacement or removal of the air bag module 20.

An example of a process of removing the peripheral components around the air bag module 20 will now be described in more detail with reference to FIGS. 7 and 8. First, the FI unit 37 (see FIG. 9) is removed from the FI unit supporting stay 34. Thereafter, the FI unit supporting stay 34 and the third supporting stay 33 spot-welded thereto are removed from the left upper tube 2L and the air bag module 20. In this condition, two of the four rings 55*a* for supporting the audio unit 40 on the left side thereof are removed, so that the audio unit 40 can be removed so as to be drawn out from the position corresponding to the third supporting stay 33. Thereafter, the left air duct 42L is removed from the air cleaner box 44, and all of the mounting screws 48 (see FIG. 8) at the fastening portions 45 of the air cleaner box 44 are loosened, so that the upper cover 41 of the air cleaner box 44 can be removed so as to be drawn out from the left front side thereof. As a result, the air filter 80 (see FIG. 8), whose frequency of maintenance is relatively high, can be easily removed, thus ensuring high maintainability.

In a normal maintenance operation, it is not necessary to remove the air bag module 20. Accordingly, in the air bag module mounting structure shown here, the right supporting stay 21R of the air bag module 20 is fixed to the supporting members 30 and 31 by means of torques bolts 30*a* and 31*a*, respectively, as shown in FIG. 10. Similarly, the left supporting stay 21L of the air bag module 20 is fixed to the supporting member 32 by means of a torques bolt 32*a* as shown in FIG. 6. These torques bolts 30*a*, 31*a*, and 32*a* are bolts that cannot be removed without a special tool. Other similar fastening means can also be used.

According to the present invention, the installation space for the air bag module can be reduced in volume, and high maintainability can be ensured. Further, various peripheral components are arranged in a concentrated matter around the air bag module, so that the maintenance of these components can be easily performed and wiring cords can be simplified to thereby realize a reduction in number of manufacturing steps. Further, owing to mass concentration, the drivability can also be improved. The peripheral components located below the air bag module are not limited in kind and shape, and the method of fastening the air bag module to the frame is not limited to that mentioned above, but various modifications may be made within the scope of the present invention.

We claim:

1. An air bag module mounting arrangement in a motorcycle comprising:
   an air bag control device, and
   an air bag module comprising an air bag folded in a casing of said air bag module,
   said air bag module provided on a pair of right and left upper tubes extending rearward from a head pipe of a frame of the motorcycle,
   wherein said air bag module spans from said right upper tube to said left upper tube,
   wherein said air bag module is provided above said right and left upper tubes at a position on a front side of a rider seating position,
   wherein said casing of said air bag module is provided with supporting stays extending downward,
   wherein said casing of said air bag module is attached to said right and left upper tubes through said supporting stays, and
   wherein said air bag control device is fixed to one of said supporting stays on one lateral side of said air bag module.

2. The air bag module mounting arrangement according to claim 1, wherein an audio unit is provided below said air bag module, and said audio unit is attached to said supporting stays.

3. The air bag module mounting arrangement according to claim 2, wherein an air cleaner box is located below said audio unit in a space between said right and left upper tubes.

4. The air bag module mounting arrangement according to claim 1, wherein an audio unit is located below said air bag module, and said audio unit is fixed to said supporting stays.

5. The air bag module mounting arrangement according to claim 4, wherein an air cleaner box is located below said audio unit and provided between said right and left upper tubes.

6. The air bag module mounting arrangement according to claim 1, wherein a fuel injection control device is fixed to another one of said supporting stays on the other lateral side of said air bag module.

7. The air bag module mounting arrangement according to claim 1, wherein said supporting stays are fixed to said upper tubes at four points, and at least one of said four points is provided by a detachable fastening structure.

\* \* \* \* \*